United States Patent
Hirst

(10) Patent No.: US 9,609,383 B1
(45) Date of Patent: Mar. 28, 2017

(54) DIRECTIONAL AUDIO FOR VIRTUAL ENVIRONMENTS

(71) Applicant: Amazon Technologies, Inc., Seattle, WA (US)

(72) Inventor: Alistair Robert Hirst, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 14/666,236

(22) Filed: Mar. 23, 2015

(51) Int. Cl.
| | |
|---|---|
| H04N 21/439 | (2011.01) |
| H04S 3/00 | (2006.01) |
| H04N 21/81 | (2011.01) |
| H04N 21/233 | (2011.01) |
| A63F 13/25 | (2014.01) |
| A63F 13/35 | (2014.01) |
| G06F 3/16 | (2006.01) |
| H04N 21/23 | (2011.01) |

(52) U.S. Cl.
CPC ......... *H04N 21/4394* (2013.01); *A63F 13/25* (2014.09); *A63F 13/35* (2014.09); *G06F 3/165* (2013.01); *H04N 21/233* (2013.01); *H04N 21/8106* (2013.01); *H04S 3/008* (2013.01); *G10H 2210/301* (2013.01); *G10H 2210/305* (2013.01); *H04N 21/23* (2013.01); *H04N 21/439* (2013.01); *H04S 2400/11* (2013.01)

(58) Field of Classification Search
CPC .............. G06F 3/165; G06F 17/30766; G11B 2020/1087; G11B 2020/10888; G11B 2020/00057; G11B 2020/105; G11B 20/10527; H04S 1/007; H04S 3/008; H04S 2400/11; H04S 2420/03; G10H 2210/301; G10H 2210/305; G10H 2240/071; H04H 20/86; H04H 20/88; H04H 20/89; H04N 21/23; H04N 21/233; H04N 21/439; H04N 21/4394; H04N 21/8106
USPC ........... 348/484, 485, 423.1; 381/17, 18, 22; 700/94
See application file for complete search history.

(56) References Cited

U.S. PATENT DOCUMENTS

| | | | | |
|---|---|---|---|---|
| 2009/0147961 | A1* | 6/2009 | Lee | H04S 3/008 381/2 |
| 2014/0037111 | A1* | 2/2014 | Uhle | H04R 3/00 381/119 |
| 2014/0079241 | A1* | 3/2014 | Chan | H04H 20/86 381/77 |

OTHER PUBLICATIONS

Bleidt, Robert, "Introducing the MPEG-H Audio Alliance's New Interactive and Immersive TV Audio System", Feb. 2015, Fraunhofer IIS, all pages.*

* cited by examiner

*Primary Examiner* — Jesse Elbin
(74) *Attorney, Agent, or Firm* — Thorpe North & Western LLP

(57) ABSTRACT

Technology is described for providing audio for digital content. The digital content may be provided to a plurality of devices. Each device may be associated with a profile. At least one group of profiles may be identified from the plurality of devices that share an affiliation. The group of profiles may be represented as a group of environment objects in the digital content. A location may be identified within the digital content that corresponds to the group of environment objects. Audio may be received for the devices. The audio may be received while the digital content is being transmitted to the plurality of devices. The audio may be transmitted to the plurality of devices for directional audio playback. The audio may be directed to correspond with the virtual location of the at least one group of environment objects in the digital content.

20 Claims, 11 Drawing Sheets

DIRECTIONAL AUDIO FOR VIRTUAL ENVIRONMENTS

BACKGROUND

Online games may include games that are played over a computer network, such as the Internet. For example, online games may be played via a game server over the Internet. Online games may range in complexity from relatively simple text-based environments to relatively complex virtual 3D (three dimensional) environments. Online games may be played by a single user, or alternatively, online games may be simultaneously played by a group of users. Non-limiting examples of online games may include fighting games, sports games, first-person shooter games, strategy games, etc.

Online games may be designed to provide high quality sound effects and music to enhance the user experience. Some online games may include an online community that enables users to communicate with one another via audio chat channels. For example, a group of users playing an online game may communicate with one another by speaking into a microphone or typing messages using an input device, such as a keyboard. Audio channels may be provided for an online game or for groups in an online game.

DETAILED DESCRIPTION

Figure 1:
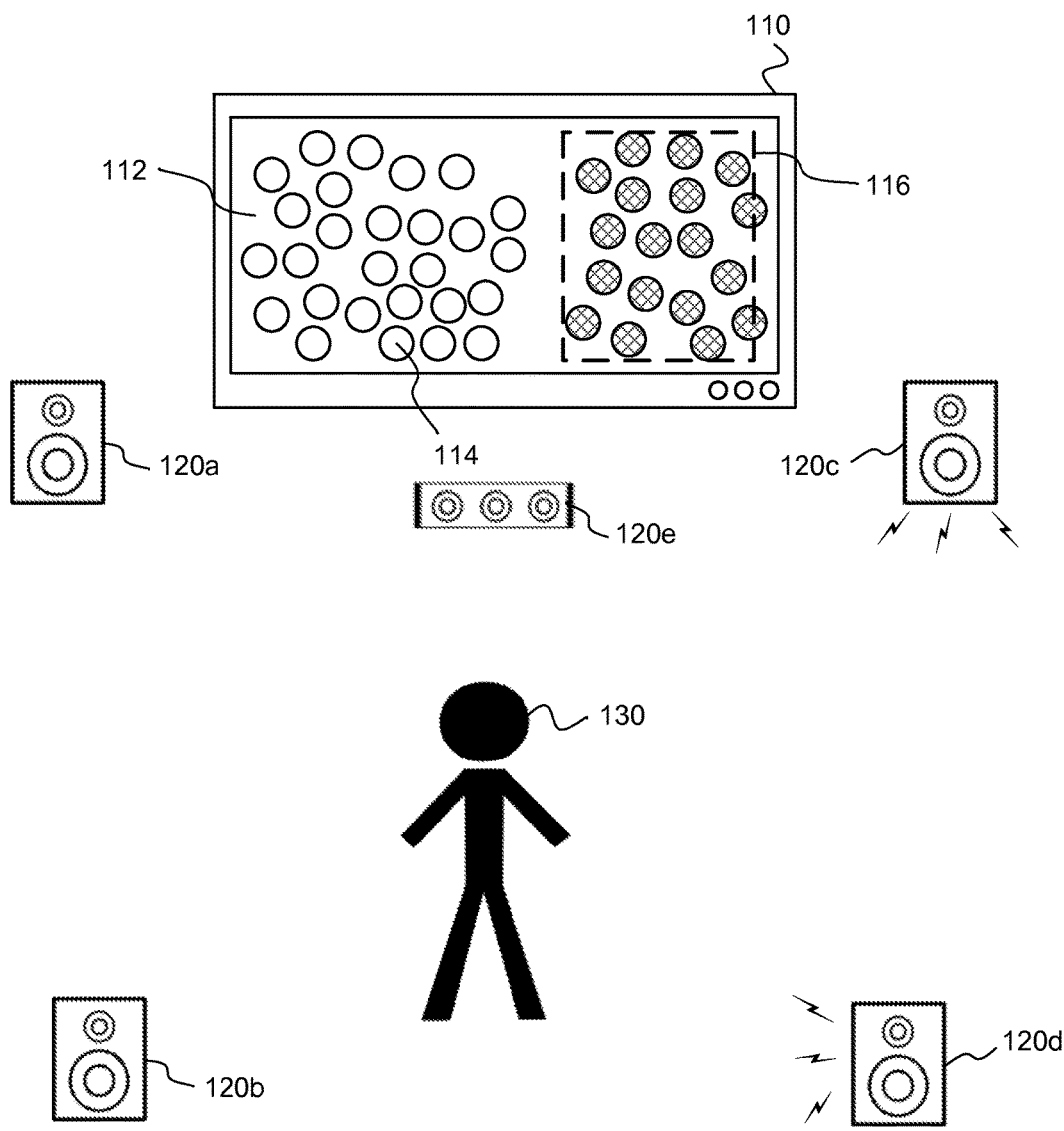
FIG. 1 illustrates a system for providing a three dimensional (3D) virtual environment with directional audio playback according to an example of the present technology.

A technology is described for providing directional audio playback for a three dimensional (3D) virtual environment. In addition, the technology described herein allows for users, such as players and spectators, interacting with, or viewing, the 3D virtual environment to be associated with digital environment objects, such as playable characters, which may in turn be associated with particular affiliations. The digital environmental objects may then be grouped based on their affiliations and audio playback may be modified to take into account such groupings. In this way, groups of digital environment objects may change depending upon the number of associated users and the outputted audio may change accordingly, for example to account for a larger or smaller group. Furthermore, the technology described herein allows for audio from users (represented by digital environmental objects), such as players and spectators, in different geographic locations to be grouped together based on their affiliations and outputted accordingly based on those affiliations.

The 3D virtual environment (also known as a 3D virtual world) may be a 3D graphical environment that is associated with any digital content or interactive digital content, such as a video game like a sports game or an action game. The 3D virtual environment may include a group of digital environment objects, such as people, actors, animals and/or machines, and these objects in the group may have a specific sound associated with the objects as a group. In addition, the environment objects may also be referred to as modeled objects. The environment objects may be associated with users, such as spectators or players, interacting with the 3D virtual environment at different locations through a network. The group of environment objects may be associated with a virtual location within the 3D virtual environment. Audio for the group of environment objects in the 3D virtual environment may be output through a surround sound system or a virtualized surround sound system. In this technology, audio sounds for a group of environment objects may be defined to correspond to the virtual location associated with the group of environment objects and defined with respect to a virtual camera looking into the 3D virtual environment, even if users associated with those environment objects are in different geographic locations interacting via a network. As a result, sounds assigned to a group of objects may be output so as to simulate audio coming from a location within the 3D virtual environment for that group of objects, even when the users associated with that group are not in the same location.

The group of environment objects may be identified from the plurality of environment objects in the 3D virtual environment. Each of the environment objects in the group may be identified using affiliation tags. Based on the affiliation tags, environment objects that are similar and share a defined characteristic with other environment objects may be grouped together. In one example, environment objects that share a defined affiliation with other environment objects may be grouped together. The affiliation may be with a particular team, military group, sports player, etc. As a non-limiting example, the 3D virtual environment may depict a plurality of soldiers on a battlefield and the 3D digital models of the soldiers may be considered environment objects. The soldiers fighting for a first army (as indicated by their respective affiliation tags) may be grouped together, whereas soldiers on the battlefield fighting for a second army may be grouped together. As another non-limiting example, soldiers in red uniforms may be grouped together, whereas soldiers in blue uniforms may be grouped together. Therefore, based on the affiliation tag associated with each environment objects, a group of related environment objects may be grouped together.

A virtual location within the 3D virtual environment may be identified for the group of environment objects. The virtual location may be associated with a relative orientation, position and/or spatial location of the group of environment objects within the 3D virtual environment. The virtual location may be relative to a virtual camera position, and the simulated camera position may correspond to a user's view when looking into the 3D virtual environment. In one example, the virtual location may be defined based on the group of environment objects. As a non-limiting example, the soldiers fighting for the first army may be located across a river in the distance in the 3D virtual environment, whereas soldiers fighting for the second army may be located closer in front of the virtual camera. In other words, the grouping of the environment objects may change depending on the affiliation of the user viewing the 3D virtual environment.

Audio may be selected for the group of environment objects within the 3D virtual environment. The audio may include, but is not limited to, sound effects, music, voices, speech, songs, weapon noises, animal noises, machine noises etc. The audio may be selected from an audio database associated with the online game and/or the 3D virtual environment. In one example, the audio may be selected for the group of environment objects when a defined event occurs within the 3D virtual environment. The defined event may be an action or incident that occurs within the 3D virtual environment. A non-limiting example of the defined event may include a first army claiming victory over a second army, in which case celebratory music may be selected for playback.

The audio that is associated with the group of environment objects at the virtual location may be transmitted to enable directional audio playback. For example, the audio may be transmitted for directional audio playback on a virtualized surround sound system or a surround sound system. The audio may be directed to correspond with the virtual location in the 3D virtual environment for the group of environment objects with respect to the virtual camera used to render the 3D virtual environment. In addition, the audio may be directed in X, Y and/or Z dimensions. The 3D virtual environment may be displayed on a display screen (e.g., a television or LCD (liquid crystal display) output) while the audio is being played through the surround sound system. The audio may be provided to have a sound intensity that corresponds with a number of environment objects in the group and the defined event that occurs within the 3D virtual environment. As a non-limiting example, marching sounds for a second army located in proximity to the virtual camera may be played using all of the speakers of the surround sound system, whereas gunfire noises from a first army located in the distance away from the virtual camera may be played faintly using front and center-oriented speakers. Therefore, via the surround sound system, the user interacting with the 3D virtual environment may perceive the marching sounds as being nearby (e.g., as if the user himself is marching in the second army), and the user may perceive the gunfire noises as being far in the distance.

In one example, the audio that is associated with the group of environment objects (e.g., a crowd of people) may not be a single point source, and therefore, the audio may be spread across multiple speakers of the surround sound system. A spread control (also referred to as focus control or divergence control) may function to spread the audio across the multiple speakers. The audio may be spread across the multiple speakers based on a certain value or percentage associated with the audio. For example, at 0%, the audio for the group of environment objects may be associated with a single point source (i.e., the audio may be projected from a single speaker in the surround sound system). When the spread value is 50%, then the audio may be spread across a few speakers (e.g., 3 speakers of 6 speakers). At 100%, the audio for the group of environment objects may be associated with a plurality of point sources (i.e., the audio may be projected from all of the speakers in the surround sound system). The number of environment objects in the group or the distance between object in the group may determine a spread value for the audio associated with the group of environment objects.

In an additional configuration, the 3D virtual environment may be transmitted (e.g., broadcasted) to a plurality of devices to enable users to act as spectators and view the 3D virtual environment. The 3D virtual environment that is transmitted may replicate a sports game or an action game that is currently being played by a game player or a group of game players. Each device that receives the transmission or broadcast may be associated with a user profile, which defines a user's interests and affiliations. A group of user profiles that share a defined affiliation or interest may be identified. The group of user profiles may be represented as a group of environment objects and assigned a virtual location within the 3D virtual environment. For example, the group of user profiles may be represented as virtual people viewing as a group from the stadium stands. Audio may be received from all the devices or a subset of devices (i.e., some of the plurality of devices) that are associated with a group of user profiles. In this way, audio received from the devices may be processed after receiving it, or the system may determine that audio only from a particular group will be received in the first place. The audio may be of the users interacting with the 3D virtual environment or spectators who are currently viewing the 3D virtual environments. The audio may be captured via microphones at the devices in the subset. In one example, the audio may be received when a defined event occurs in the 3D virtual environment. The audio received from the subset of devices may be combined, and then transmitted back out to the plurality of devices with an added virtual location component that provides directional audio playback. The audio may be directed to correspond with the virtual location of the group of environment objects with respect to the virtual camera looking into the 3D virtual environment. Thus, the combined audio may sound like a group of fans cheering from one defined location in the stadium to the user(s), even though the affiliated users and spectators are in separate locations.

As a non-limiting example, a virtual soccer match may be transmitted to a group of ten devices defined as spectators. The virtual soccer match may feature team A and team B. Based on the user profiles associated with each of the ten devices, four devices may indicate an affiliation with team A and six devices may indicate an affiliation with team B. The user profiles associated with team A may be represented as a first subset of people and assigned to a western region of a virtual soccer stadium, and the user profiles associated with team B may be represented as a second subset of people and assigned to an eastern region of the virtual soccer stadium. When team A scores a goal, the four devices with user profiles indicating the affiliation with team A may use microphones to capture cheering from their respective users and transmit the cheering noises. Alternatively, the users may push a button that represents cheering and pre-recorded cheers can be played in ratio to the number of users pushing buttons. The cheering noises may be directed to the ten devices for directional playback. When the six devices with the user profiles indicating the affiliation with team B hear the cheering noises, the cheering may be output as coming from the western region of the virtual soccer stadium. When the four devices with the user profiles indicating the affiliation with team A hear their own cheering noises, the users may perceive the cheering to be nearby and surrounding them. As another example, all of the devices may capture audio and it would be outputted according to affiliation, so as to simulate audio in a crowd, which would include audio from both affiliations.

FIG. 1 illustrates an exemplary system for providing a three dimensional (3D) virtual environment 112 with directional audio playback. The 3D virtual environment 112 may be displayed on a device 110, such as a television or display, and perceived by a user 130. The 3D virtual environment 112 may be associated with a virtual stadium for an online sports game. The 3D virtual environment 112 may include a plurality of environment objects 114, such as a crowd of people cheering during the sports game. Each environment object 114 may include an affiliation tag, which designates an interest or affiliation for the environment 114. In FIG. 1, the shaded environment objects 116 may represent a crowd of people rooting for an away team, and the unshaded environment objects 114 may represent a crowd of people rooting for a home team. In one example, a group of environment objects 116 with related interests or affiliations may be identified from the plurality of environment objects 114 using the affiliation tags. Therefore, as shown in FIG. 1, the shaded environment objects 116 may be grouped together because of their shared affiliation for the away team. A virtual location within the 3D virtual environment 112 may be identified for the group of shaded environment objects 116. In the example shown in FIG. 1, the virtual location of the group of shaded environment objects 116 may be towards a right side of the virtual stadium with respect to a virtual camera looking into the 3D virtual environment 112. In one example, the virtual location may be predefined for supporters of the away team.

When a defined event occurs within the 3D virtual environment 112 (e.g., the away team scores a goal), audio may be selected for the group of environment objects 116 (e.g., cheering noises). The group of environment objects 116 may be grouped based on affiliation and displayed in the 3D virtual environment together, even though the users associated with those environment objects may be located in separate geographic areas, for example interacting with the 3D virtual environment 112 over a network. The audio may be transmitted to the device 110 being accessed by a user for directional audio playback via a surround sound system. The surround sound system may include audio speakers 120a-e. The audio may be directed to correspond with the virtual location of the group of environment objects 116 with respect to the virtual camera looking into the 3D virtual environment 112. Since the group of environment objects 116 is located towards the right side of the virtual stadium with respect to the virtual camera, the audio of the cheering may be directed to audio speakers 120c-d. For example, audio channels may be routed to the audio speakers 120c-d, but not the audio speakers 120a-b during the audio directional playback. Therefore, the user 130 may perceive the cheering as coming from the right side of the virtual stadium. As the group of environment objects 116 with similar affiliations move within the 3D virtual environment 112 (i.e., the virtual location associated with the group of environment objects 116 changes), the audio associated with the group of environment objects 116 may be outputted to correspond with an updated virtual location. For example, if the group of environment objects 116 (e.g., virtual spectators) move towards a left side of the virtual stadium to exit after a game loss, audio of spoken complaints from the virtual spectators may be directed to the left audio speakers 120a-b. Therefore, audio associated with the group of environment objects 116 may be dynamically directed based on the changing virtual location associated with the group of environment objects 116.

Figure 2A:
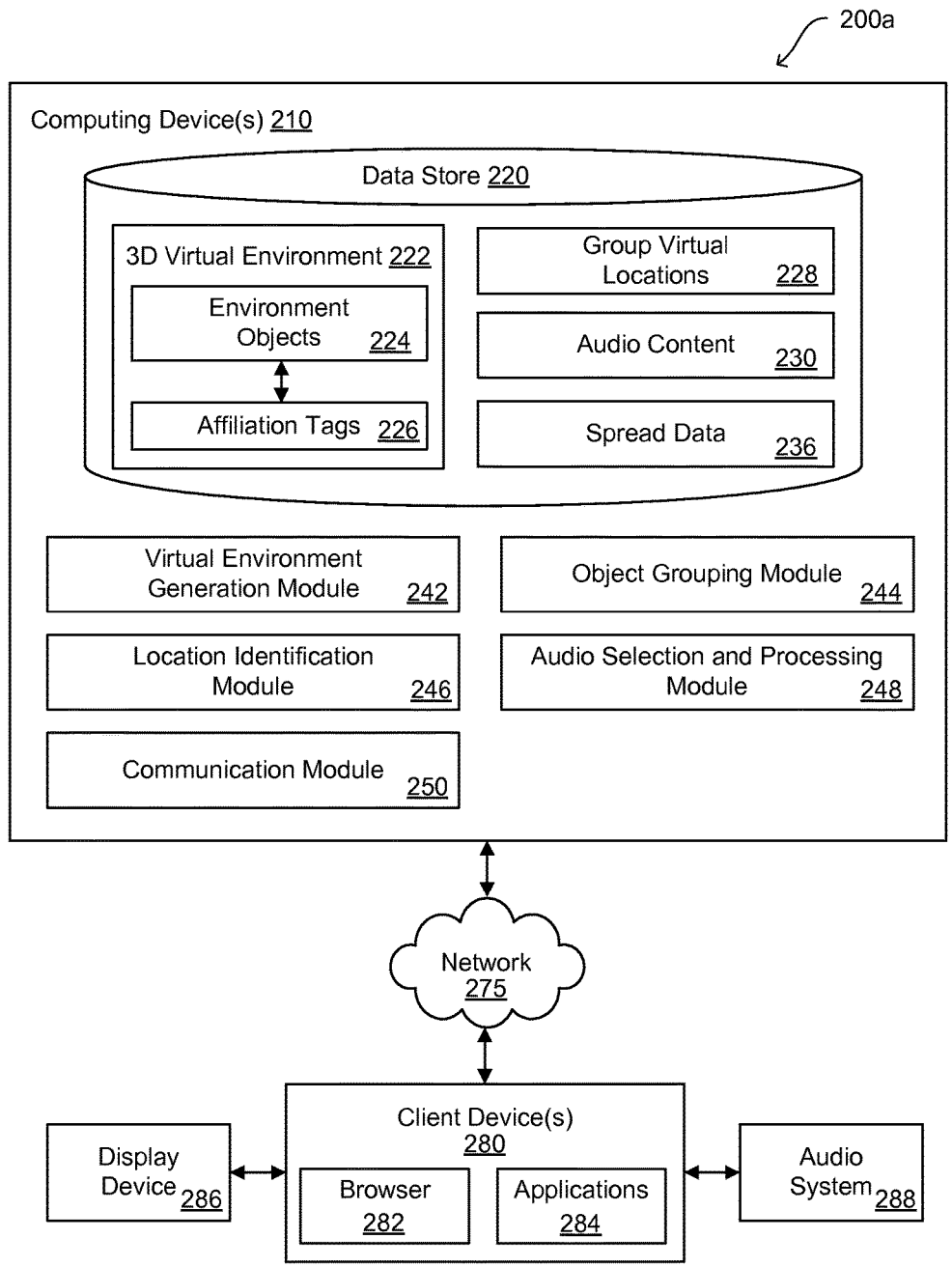
FIG. 2A is an illustration of a networked system for providing audio for a three dimensional (3D) virtual environment according to an example of the present technology.

In the following discussion, a general description of an example system for providing audio for a three dimensional (3D) virtual environment and the system's components are provided. The general description is followed by a discussion of the operation of the components in a system for the technology. FIG. 2A illustrates a networked environment 200a according to one example of the present technology. The networked environment 200a may include one or more computing devices 210 in data communication with a client device 280 by way of a network 275. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying configurations. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a three dimensional (3D) virtual environment 222. The 3D virtual environment 222 may be created from a set of geometries, textures, etc., and the 3D virtual environment 222 may be associated with an online game, such as a sports game, a fighting game, an action game, a strategy game, etc. The 3D virtual environment 222 may be a computer-based simulated environment that displays 3D scenes, buildings, objects, characters, etc. Further the 3D virtual environment 222 may depict a wide variety of landscapes, such as cities, buildings, castles, houses, vehicles, jungles, beaches, rainforests, rivers, deserts, mountains, fantasy backdrops, etc. In many cases, the 3D virtual environment 222 may be displayed from a perspective point of view using a virtual camera.

The data stored in the data store 220 may include environment objects 224. The environment objects 224 (also referred to as modeled objects) may be included within the 3D virtual environment 222. A plurality of environment objects 224 may be included within the 3D virtual environment 222. Non-limiting examples of the environment objects 224 may include persons, animals, fantasy creatures, fantasy heroes, machines, etc. In some examples, the environment objects 224 may include a crowd of people in a virtual stadium or soldiers on a battleground.

The data stored in the data store 220 may include affiliation tags 226. The affiliation tags 226 may be associated with the environment objects 224 included in the 3D virtual environment 222. An affiliation tag 226 may indicate certain interests or affiliations of the environment object 224. As a non-limiting example, if the environment object 224 is a spectator in a virtual sports game, the affiliation tag 226 may indicate which team the spectator is supporting. In another example, if the environment object 224 is a fighter in a virtual fighting game, the affiliation tag 226 may indicate a particular side or group associated with the fighter. The environment objects 224 that represent fighters may have corresponding affiliation tags 226 and may be grouped together for audio output purposes. Then live audio from users associated with those environment objects or fighters or pre-recorded audio that is controlled by users may be grouped together and output via audio system 288. The audio from these fighters with the corresponding affiliation tags 226 may also be moved as a group when the fighters move as a group during game play. In yet another example, the affiliation tag 226 may indicate a virtual occupation, political affiliation, hobbies, etc. that is associated with the environment object 224

The data stored in the data store 220 may include group virtual locations 228. A group virtual location 228 may be associated with each group of environment objects 224 in the 3D virtual environment 222. The group virtual location 228 may indicate a relative orientation, position and/or spatial location of the group of environment objects 224 within the 3D virtual environment 222. Alternatively, the group virtual location 228 may be from the perspective of a virtual camera looking into the 3D virtual environment 222. In some examples, the group virtual location 228 may correspond with a left, right, upper, lower, front, or rear area of the 3D virtual environment 222 with respect to the virtual camera. Non-limiting examples of the group virtual location 228 may include a field within a virtual stadium, an area adjacent to the field within the virtual stadium, an upper seating area within the virtual stadium, etc.

The data stored in the data store 220 may include audio content 230. The audio content 230 may be associated with the online game and/or the 3D virtual environment 222. The audio content 230 may include, but is not limited to, sound effects, music, voices, speech, songs, animal noises, etc. In one example, the audio content 230 may be associated with predefined events that can occur within the 3D virtual environment 222. For example, audio of cheering noises may be associated with the predefined event of a goal being scored during a game.

The data stored in the data store 220 may include spread data 236. The spread data 236 may include spread values (also referred to as focus values or divergence values) for determining the spread or focus of audio output for sound effects, music, noises, etc. included in the audio content 230. The spread data 236 may enable the sound from a source to be spread out among multiple audio speakers. Furthermore, the spread data 236 may enable the sound for a grouping of environment objects 224 to represent a single point source or a plurality of point sources. The spread data 236 may include certain values or percentages for the sounds in the audio content 230. For example, audio with a spread value of 0% may be associated with the single point source and the audio may be projected from a single speaker in a surround sound system). Audio with a spread value of 75% may be associated with the plurality of point sources in the virtual world and the audio may be projected from 75% of the speakers in the surround sound system). In one example, the spread values in the spread data 236 may be determined based on a number of environment objects 224 in the group.

The components executed on the computing device 210 may include a virtual environment generation module 242, an object grouping module 244, a location identification module 246, an audio selection and processing module 248, a communication module 250, and other applications, services, processes, systems, engines, or functionality not discussed in detail herein. The virtual environment generation module 242 may be configured to generate the 3D virtual environment 222 to depict a plurality of environment objects 224. The 3D virtual environment 222 may be a computer-based simulated environment that is displayed to a user (e.g., a person playing an online game) via the client device 280. The 3D virtual environment 222 may include a plurality of environment objects 224, such as persons, animals, fantasy creatures, fantasy heroes, machines, etc. The environment objects 224 may be rendered using a virtual camera with a view into the 3D virtual environment 222. In addition, the virtual environment generation module 242 may generate the 3D virtual environment 222 to allow for user interaction. For example, a user may explore the 3D virtual environment 222, perform queries within the 3D virtual environment 222, perform actions, interact with other users, carry out missions via a character or the user's avatar within the 3D virtual environment 222, etc.

The object grouping module 244 may be configured to identify a group of environment objects 224 from the plurality of environment objects 224 using affiliation tags 226. The affiliation tags 226 may identify an interest or affiliation associated with each environment object 224. Based on the affiliation tags 226, the object grouping module 244 may group together environment objects 224 that are similar and share a defined characteristic and/or affiliation with other environment objects 224. Non-limiting examples of the interest or affiliation may involve a particular team, military group, sports player, etc.

The location identification module 246 may be configured to identify a group virtual location 228 within the 3D virtual environment 222 that corresponds to the group of environment objects 224. The group virtual location 228 may be associated with a relative orientation, position and/or spatial location within the 3D virtual environment 222 and/or the group virtual location 228 may be relative to a simulated camera position in the 3D virtual environment 222. The virtual camera position may correspond to a user's view when looking into the 3D virtual environment 222. In one example, the location identification module 246 may identify the group virtual location 228 based on a predefined group type associated with the environment objects 224. In another example, the location identification module 246 may identify an updated group virtual location 228 for the group of environment objects 224 as the environment objects 224 in the group move within the 3D virtual environment 222. In yet another example, the location identification module 246 may place the group of environment objects 224 (e.g., an audience or characters) within the 3D virtual environment 222 according to a predefined configuration.

The audio selection and processing module 248 may be configured to select audio for the group of environment objects 224 when a defined event occurs within the 3D virtual environment 222. Audio content 230 selected by the audio selection and processing module 248 may include, but is not limited to, sound effects, music, voices, speech, songs, animal noises, etc. The audio selection and processing module 248 may select audio content 230 that is associated with an online game being played by a user. In addition, the audio selection and processing module 248 may select the audio content 230 based on the defined event, which may be an action or incident that occurs within the 3D virtual environment 222. The audio selection and processing module 248 may determine how the selected audio is to be outputted based on the affiliation tags 226 associated with the group of environment objects 224. For example, the audio selection and processing module 248 may determine that the selected audio is to be directed in a particular direction based on: the group virtual location 228 associated with the group of environment objects 224 and the group virtual location 228 determined based on the affiliation tags 226 of the group of environment objects 224.

The communication module 250 may be configured to provide the audio that is associated with the group of environment objects 224 at the group virtual location 228 in the 3D virtual environment 222 to enable directional playback. For example, the communication module 250 may transmit the audio content 230 for directional audio playback using a virtualized surround sound system or a surround sound system. The audio content 230 may be directed for playback in X, Y and/or Z dimensions. The communication module 250 may direct the audio content 230 to correspond with the group virtual location 228 with respect to the virtual camera looking into the 3D virtual environment 222. Therefore, when the audio content 230 is played using the surround sound system, the sound may be directed in a manner that corresponds with the group virtual location 228 of the group of environment objects 224 with respect to the virtual camera. The audio content 230 may be played using the surround sound system while the 3D virtual environment 222 is displayed via the client device 280. In addition, the communication module 250 may provide the audio content 230 at a sound intensity that corresponds with a number of environment objects 224 in the group or a distance from a user (i.e., listener) and the defined event that occurs within the 3D virtual environment 222.

In one configuration, various server components and data store components included in the computing device 210 may be located on the client device 280. For example, the 3D virtual environment 222 and/or the group virtual locations 228 may be stored at the client device 280. In addition, the virtual environment generation module 242, the object grouping module 244, the location identification module 246, the audio selection and processing module 248 and/or the communication module 250 may be executed on the client device 280.

Certain processing modules may be discussed in connection with this technology and FIG. 2A. In one example configuration, a module of FIG. 2A may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties, such as developers of the 3D virtual environment like video game developers, simulation developers (e.g., flight and driving simulators), or broadcasters, to interface with the modules and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The client device 280 may be representative of a plurality of client devices that may be coupled to the network 275. The client device 280 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability.

The client device 280 may be configured to execute various applications such as a browser 282, and/or other applications 284. The applications 284 may correspond to code that is executed in the browser 282 (e.g., web applications). The applications 284 may also correspond to standalone applications, such as networked applications. The applications 284 may include games, such as a sports game, a fighting game, a strategy game, war game, etc. that are executed on the client device 280. The applications 284 may be executed in order to generate or render the 3D virtual environment 222 for display on the client device 280.

The client device 280 may include or be coupled to display device 286. The browser 282 may be executed on the client device 280, for example, to access and render network pages (e.g. web pages) or other network content served up by the computing device 210 and/or other servers. The display device 286 may comprise, for example, one or more devices such as cathode ray tubes (CRTs), liquid crystal display (LCD) screens, gas plasma-based flat panel displays, LCD projectors, or other types of display devices, etc. In addition, the display device 286 may include an audio device, tactile device (e.g., braille machine) or another output device to feedback to a customer.

The client device 280 may include or be coupled to an audio system 288. For example, the audio system 288 may include a surround sound system or a virtualized surround sound system. The audio system 288 may route a defined number of audio channels to a group of loudspeakers, such that listeners may perceive sound from substantially all directions. In some examples, the audio system 288 may include a 5.1 surround sound system or a 7.1 surround sound system.

Figure 2B:
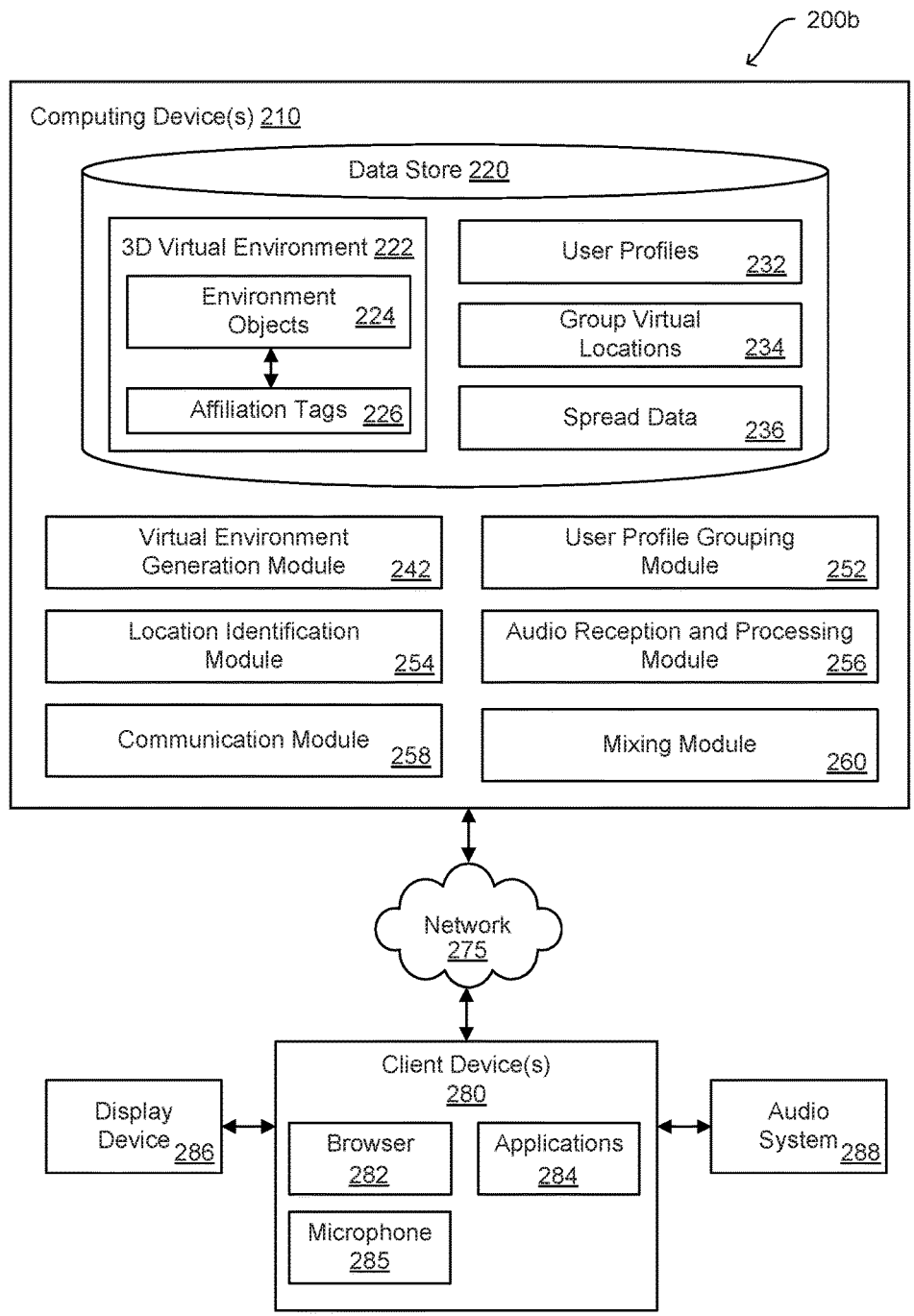
FIG. 2B is an illustration of an additional networked system for providing audio for a three dimensional (3D) virtual environment according to an example of the present technology.

FIG. 2B illustrates a networked environment 200b for providing audio for a three dimensional (3D) virtual environment according to one example of the present technology. The networked environment 200b may include one or more computing devices 210 in data communication with a client device 280 by way of a network 275.

Various data may be stored in a data store 220 that is accessible to the computing device 210. As previously described, the data store 220 may include the 3D virtual environment 222, the environment objects 224, the affiliation tags 226, and the spread data 236.

The data store 220 may include user profiles 232. A user profile 232 may be associated with each of the client devices 280. The user profile 232 may indicate certain interests or affiliations of a user associated with the client device 280. For example, the user profile 232 may indicate an interest or affiliation with a particular team, sports players, entities in warfare, etc. In one configuration, more than one user profile 232 may be associated with the client device 280.

The data store 220 may include group virtual locations 234. The group virtual location 234 may be for a group of environment objects 224 within the 3D virtual environment 222. The group virtual location 234 may indicate a relative orientation, position and/or spatial location of the group of environment objects 224 within the 3D virtual environment 222. Each user profile 232 may be represented as an environment object 224 and assigned a group virtual location 234 in the 3D virtual environment 222. Similarly, each group of user profiles 232 may be represented as a group of environment objects 224 and assigned a group virtual location 234 in the 3D virtual environment 222. The group virtual location 234 may be from the perspective of a virtual camera looking into the 3D virtual environment 222.

The computing device 210 may include a virtual environment generation module 242, a user profile grouping module 252, a location identification module 254, an audio reception and processing module 256, a communication module 258, and a mixing module 260. As previously described, the virtual environment generation module 242 may be configured to generate the 3D virtual environment 222. The 3D virtual environment 222 may be transmitted to a plurality of client devices 280 to enable users to view the 3D virtual environment 222. Each client device 280 may be associated with a user profile 232.

The user profile grouping module 252 may be configured to identify a group of user profiles that share a defined affiliation. For example, the user profile grouping module 252 may group together user profiles 232 that share the same affiliation or interest. The group of user profiles 232 may be represented as a group of environment objects 224 in the 3D virtual environment 222. As a non-limiting example, when interests or affiliations listed in a first user profile correlate to interests or affiliations listed in a second user profile, the user profile grouping module 252 may group the first user profile with the second user profile.

The location identification module 254 may be configured to assign a group virtual location 234 within the virtual environment 222 to the group of environment objects 224. The group virtual location 234 may be associated with a relative orientation, position and/or spatial location within the 3D virtual environment 222. The group virtual location 234 may be relative to a simulated camera position in the 3D virtual environment 222. The simulated camera position may correspond to a user's view when looking into the 3D virtual environment 222. In one example, the location identification module 254 may identify the group virtual location 234 of the group of environment objects 224 based on a predefined affiliation or interest type indicated in the user profiles 232.

The audio reception and processing module 256 may be configured to receive audio from a subset of client devices 280 that are associated with the group of user profiles 232. The audio may be received in real time from actual users who are watching the 3D virtual environment 222. The audio may be received while the 3D virtual environment is being transmitted to the plurality of client devices 280. The audio that is received may be of a user speaking, yelling, cheering, trash talking, etc. into a microphone of the client device 280. In one example, the audio may be received from the subset of client devices 280 when a defined event occurs in the 3D virtual environment 222. Non-limiting examples of the defined event may include a goal or basket being scored, one party becoming victorious over another party in a battle, one teaming winning over another team in a sporting match, etc.

In one example, the audio reception and processing module 256 may receive audio from the plurality of client devices 280. The audio reception and processing module 256 may filter the audio received from the plurality of client devices 280 to extract only audio that is associated with a certain grouping of environment objects 224 (or group of user profiles 232). In addition, the audio reception and processing module 256 may determine how the received audio is to be outputted based on the user profiles 232 associated with the group of environment objects 224. For example, the audio processing and processing module 256 may determine that the received audio is to be directed in a particular direction based on the group virtual location 228 associated with the group of environment objects 224.

The mixing module 260 may be configured to mix or combine the audio received from the subset of client devices 280 that are associated with the group of user profiles 232. For example, the mixing module 260 may combine multiple sounds into one or more channels. The mixing module 260 may adjust sound levels, frequency, content, dynamics, etc. when combining the audio. In addition, the mixing module 260 may add effects, such as reverberation or frequency shifting. Therefore, the mixing module 260 may combine the audio (e.g., speaking, yelling, cheering) to produce mixed audio that may be more appealing to listeners.

The communication module 258 may be configured to transmit mixed audio to the plurality of client devices 280 for directional audio playback. For example, the communication module 258 may transmit the mixed audio for directional audio playback on a virtualized surround sound system or a surround sound system. The mixed audio may be directed to correspond with the group virtual location 234 of the group of environment objects 224 in the 3D virtual environment 222. Therefore, when the mixed audio is played on the surround sound system, the sound may be directed in a manner that corresponds with the group virtual location 234 of the group of environment objects 224 with respect to the virtual camera looking into the 3D virtual environment 222. The mixed audio may be played using the surround sound system while the 3D virtual environment 222 is displayed via the client device 280. For example, the communication module 258 may transmit mixed audio for the group of environment objects 224 when a particular team wins a match. The mixed audio may include cheering and be from a group of spectators that are supporting the particular team.

In one example, the client device 280 may include a microphone 285 to capture audio from actual users who are watching the 3D virtual environment 222. For example, the microphone 285 may capture cheering, yelling, commenting, booing, trash talking, etc. from the actual users who are watching the 3D virtual environment 222. The audio captured by the microphone 285 may be received at the audio reception and processing module 256.

Figure 3:
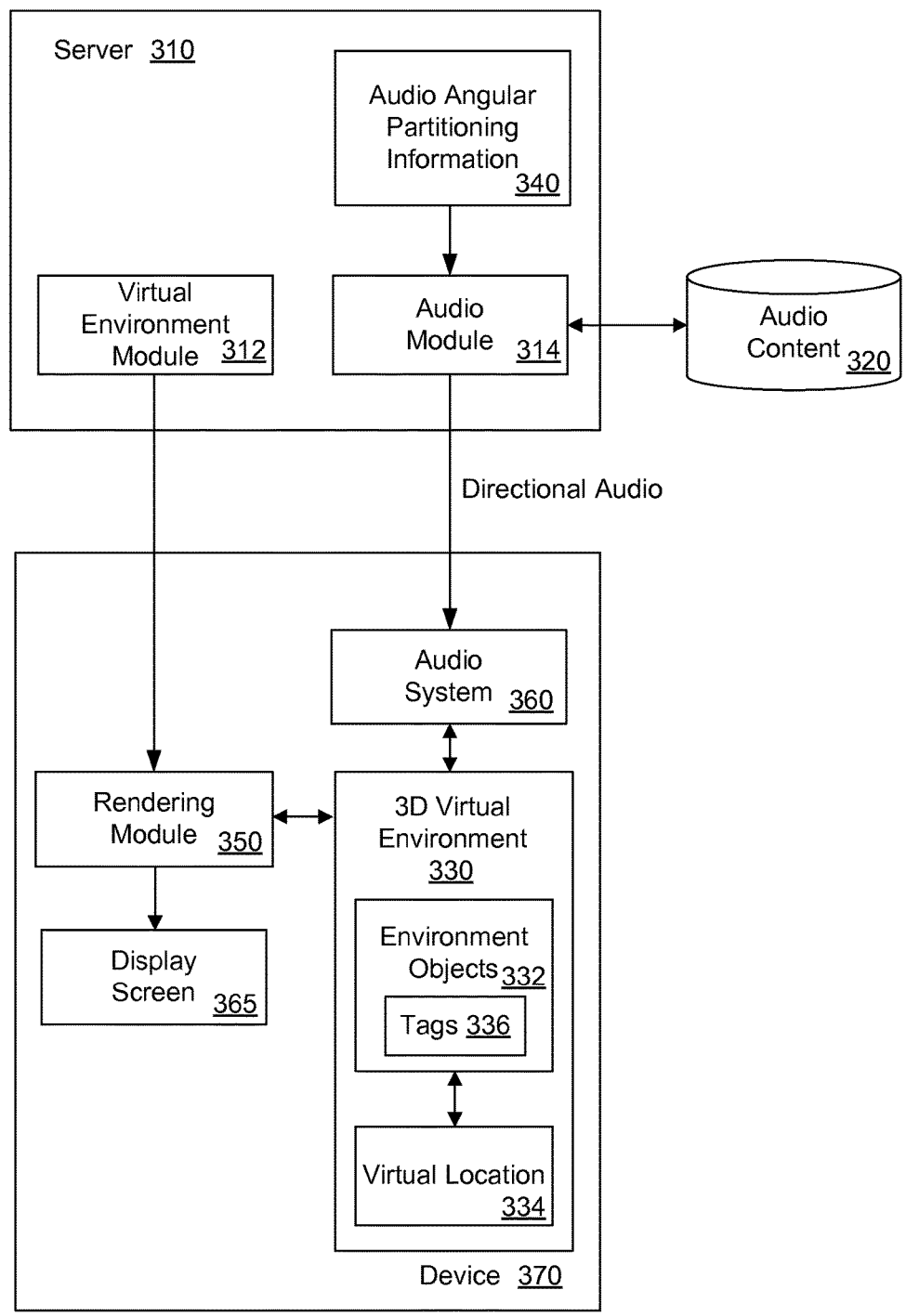
FIG. 3 illustrates a system and related operations for providing a three dimensional (3D) virtual environment with directional audio playback according to an example of the present technology.

FIG. 3 illustrates an exemplary system and related operations for providing a three dimensional (3D) virtual environment 330 with directional audio playback. A server 310 may include a virtual environment module 312 that provides instructions to a rendering module 350 and/or a device 370 so that the rendering module 350 may generate the 3D virtual environment 330 for display at the device 370. For example, the instructions may enable the rendering module 350 to generate the 3D virtual environment 330 using a set of textures, geometries, etc. stored at the device 370. The 3D virtual environment 330 may be generated for an online game, such as a sports game or an action game. The 3D virtual environment 330 may include a plurality of environment objects 332. The environment objects 332 may include persons, animals, fantasy creatures, fantasy heroes, machines, etc. Each environment object 332 may be associated with an affiliation tag 336 that identifies an affiliation of the environment object 332.

In an alternative configuration, the virtual environment module 312 may generate the 3D virtual environment 330 and the 3D virtual environment 330 may be streamed to the device 370. In this configuration, processing and generation of the 3D virtual environment 330 may be performed on the server 310 rather than the device 370.

In one example, the environment objects 332 may be grouped together based on the affiliation tags 336. For example, environment objects 332 with similar affiliations (as indicated by the affiliation tags 336) may be grouped together. In addition, a group of environment objects 332 may be assigned a virtual location 334 within the 3D virtual environment 330. The virtual location 334 may indicate a relative orientation, position and/or spatial location within the 3D virtual environment 330. The virtual location may be relative to a simulated camera position in the 3D virtual environment 330. As an example, a first group of related environment objects may be assigned a first virtual location in the 3D virtual environment 330 (with respect to a virtual camera), and a second group of related environment objects may be assigned a second virtual location in the 3D virtual environment. In one example, the virtual location 334 may be predefined based on a group type associated with the environment objects 332.

When a defined event occurs within the 3D virtual environment 330, an audio module 314 may select audio content 320 from a database that corresponds with the defined event. The audio module 314 may select the audio content 320 for the group of environment objects 332 at the virtual location 334.

The server 310, via the virtual environment module 312, may provide instructions to the rendering module 350 to enable the rendering module 350 to generate the 3D virtual environment 330. In addition, the server 310, via the audio module 314, may provide the audio content 320 to the device 370. The audio content 320 may be provided with audio angular partitioning information 340. The audio angular partitioning information 340 may define how the audio content 320 is to be directed when played at the device 370. In other words, the audio angular partitioning information 340 may indicate that the audio content 320 is to be directed to correspond with the virtual location 334 with respect to the virtual camera. For example, if the virtual location 334 of the group of environment objects 332 is left of the virtual camera, then the audio angular partitioning information 340 may indicate that the audio content 320 is to be directed to a left set of speakers. In addition, the audio angular partitioning information 340 may include spread values for the audio content 320. The spread values (also referred to as focus values or divergence values) may function to spread the audio across multiple speakers during playback of the audio. For example, when the spread values are at 0%, the audio content 320 may be associated with a single point source. When the spread values are at 66%, the audio content 320 may be associated with a plurality of point sources. Therefore, the audio angular portioning information 340 may include a certain spread value for each sound or group of sounds in the audio content 320.

The device 370 may display the 3D virtual environment 330 via a display screen 365, and the audio module 314 may provide the audio content 320 with the audio angular partitioning information 340 to the device 370 for directional audio playback via an audio system 360. Based on the audio angular partitioning information 340, the audio system 360 may know in which direction to direct the audio content 320 for playback. The audio system 360 may route audio channels to specific loudspeakers based on the audio angular partitioning information 340. The audio system 360 may be a virtualized surround sound system or a surround sound system.

As a non-limiting example, the virtual environment module 312 may generate a 3D virtual environment 330 depicting a battle scene on a virtual battlefield, or alternatively, the virtual environment 312 may provide instructions to the rendering module 350 of the device 370 to enable the rendering module 350 to generate the battle scene using a set of geometries and textures of the 3D virtual environment 330. The environment objects 332 may be a plurality of soldiers on the virtual battlefield. Based on the affiliation tags 336, the server 310 or the device 370 may identify a group of rebel forces. The server 310 or the device 370 may identify that the virtual location 334 for the group of rebel forces is across a bridge in the distance away from the virtual camera. Based on the affiliation tags 336, the server 310 or the device 370 may also identify a group of soldiers with a virtual location 334 in front of the virtual camera. The soldiers may be grouped together at the virtual location 334 based on the affiliation tags 336 associated with the soldiers and displayed accordingly. This grouping in the virtual environment may occur even though the users controlling the soldiers are at separate geographic locations. When the rebel forces are crossing the bridge, the audio module 314 may select marching noises to represent the sounds of the rebel forces. The server 310 may provide the marching noises to the device 370. In addition, the server 310 may provide the audio angular partitioning information 340 indicating that the marching noises are to be played such that the marching noises are heard from the distance. The display screen 365 may display the battle scene, and the audio system 360 may directionally play the marching noises based on the audio angular partitioning information 340.

Figure 4:
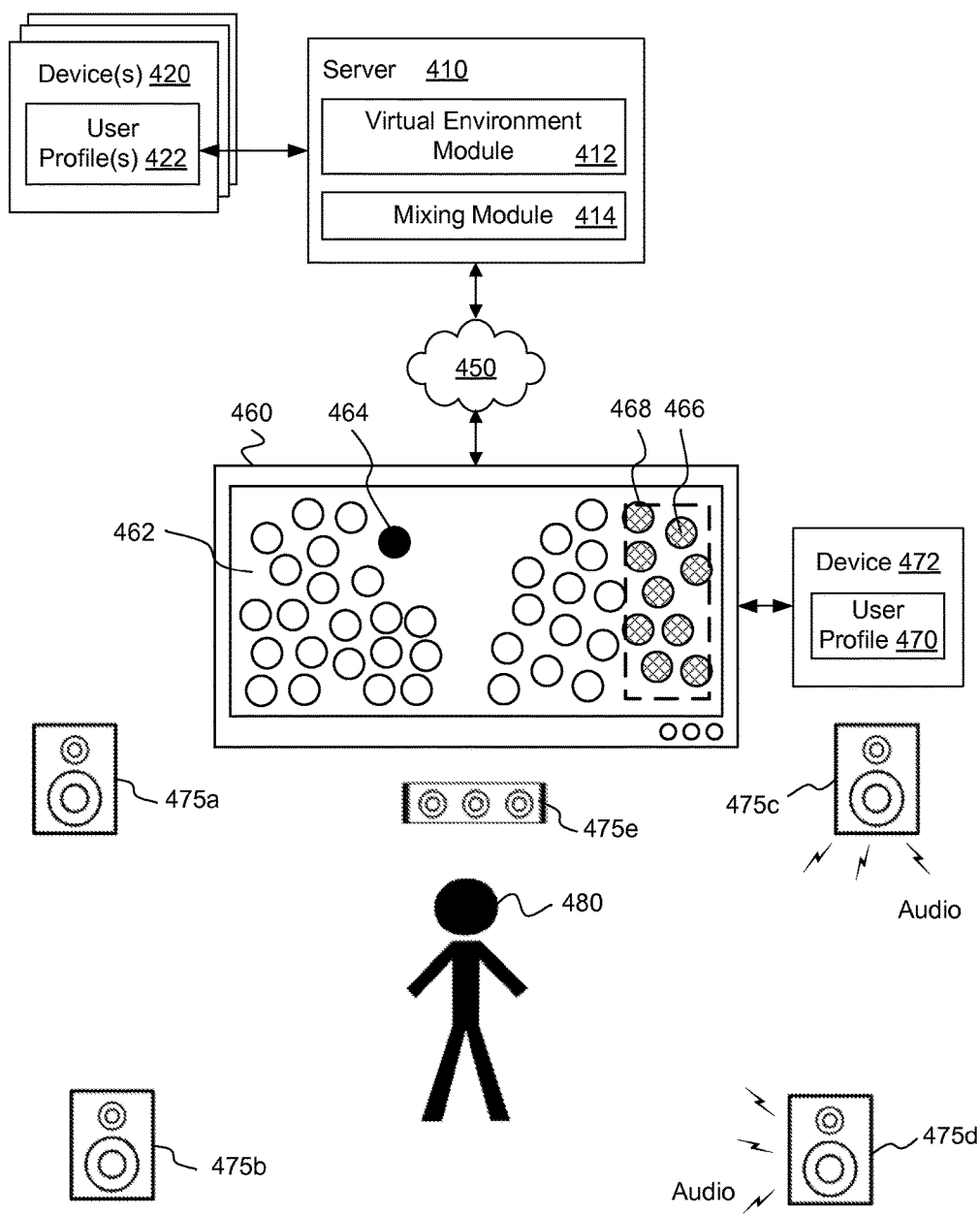
FIG. 4 illustrates a system for providing a three dimensional (3D) virtual environment with directional audio playback using audio received from a plurality of devices according to an example of the present technology.

FIG. 4 illustrates an exemplary system and related operations for providing a three dimensional (3D) virtual environment 462 with directional audio playback using audio received from a plurality of devices 420. A virtual environment module 412 may generate the 3D virtual environment 462 for display on a device 460 via a network 450. The 3D virtual environment 462 may be perceived by a user 480. The virtual environment module 412 may operate on a server 410 (e.g., a game server). The virtual environment module 412 may generate the 3D virtual environment 462 for an online game, such as a sports game, a fighting game, a strategy game, etc. The virtual environment module 412 may generate the 3D virtual environment 462 to include a plurality of environment objects 466, such as persons, animals, fantasy creatures, fantasy heroes, machines, etc. In one configuration, the 3D virtual environment 462 may be an online game that is currently being played by a game player or a group of game players. In other words, the game player or group of game players may play the online game and the 3D virtual environment 462 associated with the online game may be transmitted or broadcasted to the device 460 to enable the user 480 to perceive a gameplay of the online game as the gameplay occurs. In addition, the 3D virtual environment 462 may be transmitted to devices 420 to enable users associated with the devices 420 to view the 3D virtual environment 462.

The virtual environment module 412 may transmit the 3D virtual environment 462 to the devices 420. Each of the devices may be associated with a user profile 422 (also referred to as device profile). In addition, the virtual environment module 412 may transmit the 3D virtual environment 462 to the device 460 (e.g., a smart television). In addition, the device 460 may be connected to another device 472, such as a game console. The device 472 may be associated with a user profile 470. The user profiles 422 may describe a user's interests or affiliations. In other words, each user profile 422 or 470 may describe the interests or affiliations of the corresponding device's user(s). The interests or affiliations may be related to certain sports players, sports teams, entities in warfare, etc. The 3D virtual environment may be rendered on the device 472 that is local to the user or the rendering may also come from the server 210 (in addition to the 3D virtual environment geometry, textures, lighting, etc.).

The server 410 may identify a group of user profiles 422 that share a defined affiliation. In other words, user profiles 422 that indicate a shared interest or affiliation may be grouped together. As an example, a portion of user profiles 422 may each share a defined affiliation or interest, and therefore, the portion of user profiles 422 may be grouped together. The user profile 470 may indicate a different affiliation or interest, and therefore, may not be grouped with the portion of user profiles 422.

The server 410 may represent the group of user profiles 422 as a group of environment objects 468 within the 3D virtual environment 462. The group of environment objects 468 may be assigned a virtual location within the 3D virtual environment 462. The virtual location may be associated with a relative orientation, position and/or spatial location within the 3D virtual environment 462. The virtual location may be with respect to a virtual camera looking into the 3D virtual environment 462. The virtual location assigned to the group of environment objects 468 may be predefined based on a type of shared affiliation, as indicated in the user profiles 422.

As a non-limiting example, the 3D virtual environment 462 may depict an online soccer game. The soccer game may be played between team A and team B in a virtual stadium. The soccer game may be broadcasted to the devices 420, as well as to the device 460. User profiles 422 for the group of devices 420 may indicate an affiliation with team A, so these user profiles 422 may be grouped together. The user profile 470 may indicate an affiliation with team B, so the user profile 470 may be in a separate group. A first group of environment objects 468 that represents the group of user profiles 422 affiliated with team A may be depicted in the 3D virtual environment 462. The virtual location assigned to the first group of environment objects 468 may be an upper right portion of the virtual stadium with respect to a virtual camera looking into the 3D virtual environment 462. The user profile 470 may be represented as a separate environment object 464 since the user profile 470 indicates an affiliation with team B. The virtual location assigned to the environment object 464 may be an upper center portion of the virtual stadium with respect to a virtual camera looking into the 3D virtual environment 462. In one example, the virtual locations within the 3D virtual environment 462 for groups that support team A or team B may be predetermined.

The server 410 may receive audio from the devices 420 while the 3D virtual environment 462 is being transmitted or broadcasted. The audio may be received in from actual users who are playing and/or viewing the 3D virtual environment 462. The actual users viewing the 3D virtual environment that provide the audio may be spectators who are only viewing the 3D virtual environment 462. In addition, audio may be received from players of the online game. In other words, the players may provide audio when interacting with the 3D virtual environment 462. More specifically, the server 410 may receive audio from a group of devices 420 that are associated with the group of related user profiles 422. Each of the devices 420 may include a microphone through which the audio is captured and then transmitted to the server 410. In this example, the server 410 may not receive audio from the device 460. In another example, the audio that is received at the server 410 may be of a user speaking, yelling, commenting, cheering, booing, trash talking, etc. into the microphone of the devices 420. In one example, the audio may be received from the devices 420 when a defined event occurs in the 3D virtual environment 462 (e.g., a goal is scored, a penalty is called, a user button is pressed), or alternatively, the server 410 may continually receive the audio from the devices 420.

The server 410 may combine the audio received from the group of devices 420 associated with the group of related user profiles 422 via a mixing module 414. The server 410 may transmit mixed audio to the devices 420, as well as the device 460 for directional audio playback. The 3D virtual environment 462 may be displayed on the device 460 during the directional audio playback. The audio may be directed to correspond with the virtual location of the group of environment objects 468 in the 3D virtual environment 462. The audio may be directed to correspond with the virtual location with respect to the virtual camera in the 3D virtual environment 462. In one example, the audio may be transmitted for directional playback on a virtualized surround sound system or a surround sound system. The surround sound system may include loudspeakers 475*a-e*. In addition, the audio may be provided to have a sound intensity that corresponds with a number of environment objects in the group and the defined event that occurs within the 3D environment 462.

Continuing with the previous example, the audio provided to the server 410 from the group of devices 420 may be forwarded to the device 460. As a non-limiting example, the audio may be of cheering after a goal is scored. Since the virtual location associated with the user profile 470 is at the upper center portion of the virtual stadium and the virtual location associated with the group of environment objects 468 is the upper right portion of the virtual stadium, audio that is transmitted to the device 460 may be directed to the right side of the surround sound system. In this example, since the group of environment objects 468 is virtually located towards the right side of the virtual stadium with respect to the virtual location of the environment object 464, the audio may be directed to the device 460 such that the audio is perceived as coming from the right side. More specifically, the audio may be directed to play on the right-side loudspeakers 475*c-d* to emulate sound coming from the right side. In this case, the left-side loudspeakers 475*a-b* may not play the audio. Therefore, the user 480 may feel as if he is sitting in the upper center portion of the virtual stadium and cheering sounds are coming from the right side after the goal is scored. In addition, the graphical rendering of the 3D virtual environment may change to account for the part of the crowd that is cheering or cheering louder.

In one example, game players who are playing the online game (as opposed to the user 480 and the users associated with the devices 420 who are watching the online game being played) may also have a virtual location in the 3D virtual environment 462. The game players may also receive audio for directional playback. In the example shown in FIG. 4, when the virtual environment 462 is of an online soccer match, the game players may be virtually located on the field. Therefore, the audio heard by the game players may be directed such that the game players perceive the audio as surrounding them in all directions. Depending on a specific orientation on the virtual field, the audio may be perceived as coming from the left, right, front and/or behind.

Figure 5:
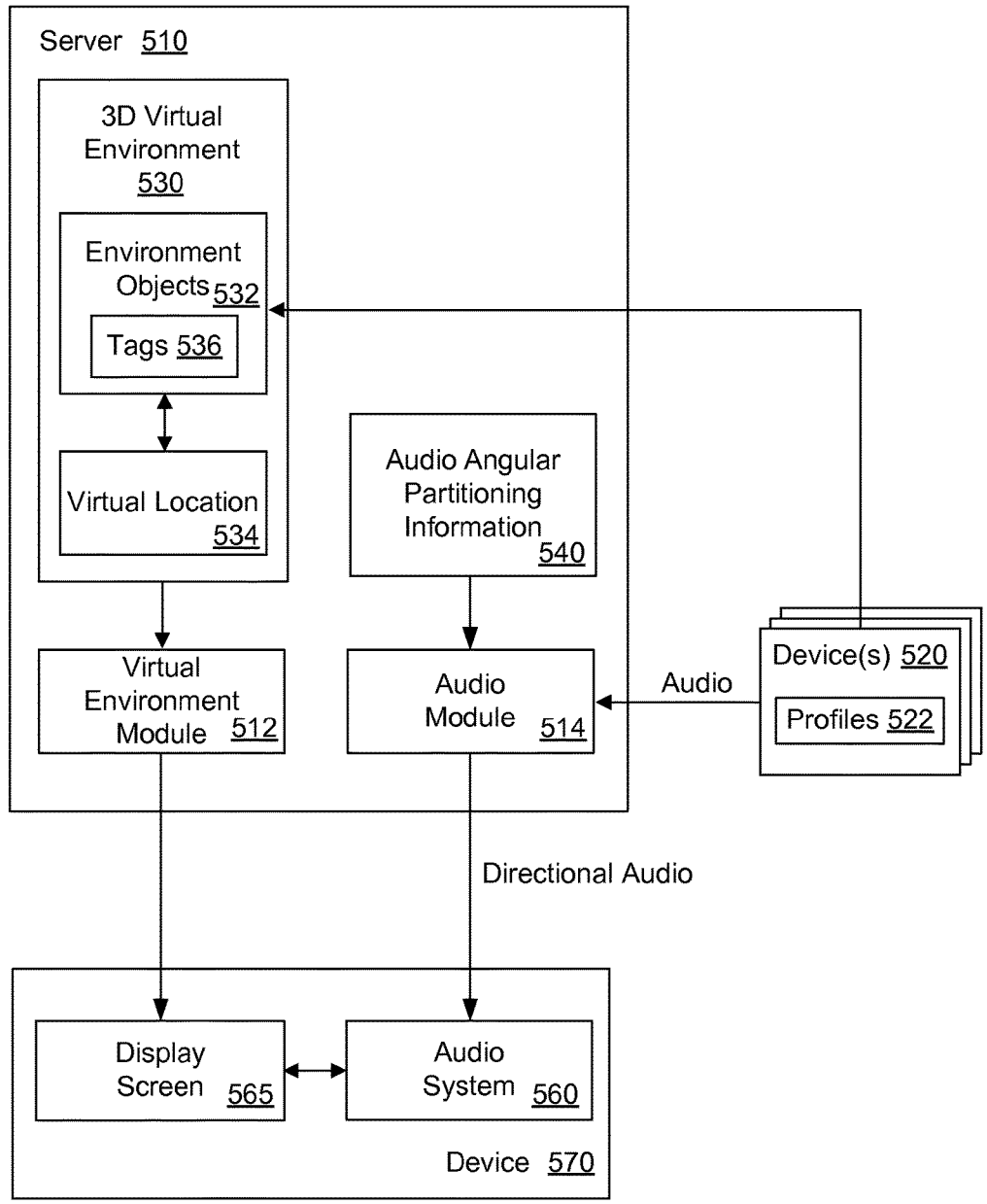
FIG. 5 illustrates a system and related operations for providing a three dimensional (3D) virtual environment with directional audio playback using audio received from a plurality of devices according to an example of the present technology.

FIG. 5 illustrates an exemplary system and related operations for providing a three dimensional (3D) virtual environment 530 with directional audio playback using audio received from a plurality of devices 520. A server 510 may include a virtual environment module 512 that provides the 3D virtual environment 530 to a device 570 for display on a display screen 565. For example, the 3D virtual environment 530 may be transmitted or broadcast from the virtual environment module 512 to the device 570. The 3D virtual environment 530 may be generated for an online game, such as a sports game or an action game. In addition, the server 510 may transmit or broadcast the 3D virtual environment 530 to the plurality of devices 520.

The devices 520 may each be associated with a user profile 522. The user profile 522 may indicate interests or affiliations associated with a corresponding device 520. In one example, the server 510 may group together user profiles 522 with similar interests or affiliations. For example, the server 510 may identify a first group with a first set of user profiles and a second group with a second set of user profiles.

The server 510 may represent each user profile 522 as an environment object 532 within the 3D virtual environment 530. Similarly, the server 510 may represent each set of related user profiles 522 as a group of environment objects 532 within the 3D virtual environment 530. A group of environment objects 532 from the plurality of environment objects may be identified using tags 536. The environment objects 532 in the group may share a defined characteristic, as indicated by the tags 536 (or affiliation tags). The environment objects 532 may include persons, animals, fantasy creatures, fantasy heroes, machines, etc. In addition, the server 510 may assign a virtual location 534 for each environment object 532 or group of environment objects 532 within the 3D virtual environment. The virtual location 534 may be from the perspective of a virtual camera looking into the 3D virtual environment 530.

When a defined event occurs within the 3D virtual environment 530, an audio module 514 may receive audio from the devices 520. For example, the audio module 514 may receive audio from the devices 520 associated with the group of user profiles 522. The audio received from the devices 520 may include cheering, booing, etc. Alternatively, the audio module 514 may constantly receive audio from the devices 520 irrespective of whether the defined event occurs or not.

The server 510, via the virtual environment module 512, may provide the 3D virtual environment 530 to the device 570. In addition, the server 510, via the audio module 514, may provide the audio to the device 570. The audio provided to the device 570 may be a combined or mixed version of the audio received from the devices 520. The audio may be provided with audio angular partitioning information 540. The audio angular partitioning information 540 may define how the audio is to be directed when played at the device 570. In other words, the audio angular partitioning information 540 may indicate that the audio is to be directed to correspond with the virtual location 534 with respect to the virtual camera. The audio angular partitioning information 540 may also include spread parameters or focus parameters for the audio. For example, if the virtual location 534 of the group of environment objects 532 (associated with the group of user profiles 522) is right of the virtual camera, then the audio angular partitioning information 540 may indicate that the audio is to be directed to a right set of speakers.

The virtual environment module 512 may provide the 3D virtual environment 530 to the device 570 for display via the display screen 565, and the audio module 514 may provide the audio with the audio angular partitioning information 540 to the device 570 for directional audio playback via an audio system 560. Based on the audio angular partitioning information 540, the audio system 560 may know in which direction to direct the audio for playback. For example, the audio system 560 may route audio channels to specific loudspeakers based on the audio angular partitioning information 540. The audio system 560 may be a virtualized surround sound system or a surround sound system comprising one or more loudspeakers.

Figure 6A:
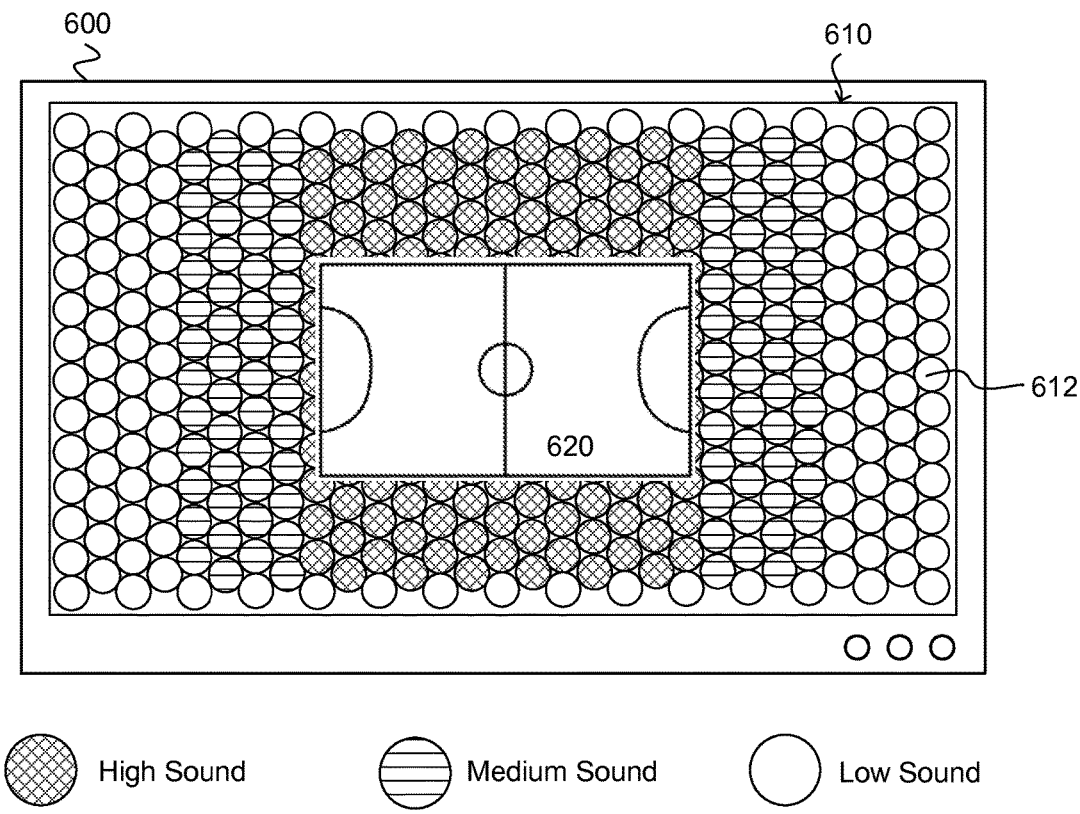
FIG. 6A is an illustration of a map of sound intensity levels for a three dimensional (3D) virtual environment according to an example of the present technology.

FIG. 6A is an exemplary graphical object 610 illustrating a map of sound intensity levels for a three dimensional (3D) virtual environment 620. The 3D virtual environment 620 may be part of an online game, such as a sports game. The graphical object 610 may be displayed as an overlay on the 3D virtual environment 620. The graphical object 610 may take up an entire portion of a display screen 600, or alternatively, the graphical object 610 may cover a reduced portion of the display screen 600. The graphical object 610 may include a plurality of sound indicators 612. Each sound indicator 612 may represent a sound intensity level or noise level for a virtual point within the 3D virtual environment 620. Each sound indicator 612 may be shaded or colored based on the sound intensity level at the virtual point. For example, a first type of sound indicator 612 (e.g., a clear indicator) may indicate when the sound intensity level at the virtual point is relatively low. A second type of sound indicator 612 (e.g., a first type of shaded indicator) may indicate when the sound intensity level at the virtual point is medium. A third type of sound indicator 612 (e.g., a second type of shaded indicator) may indicate when the sound intensity level at the virtual point is relatively high.

In the example shown in FIG. 6, the 3D virtual environment 620 may be of a basketball court and a crowd of people surrounding the court in a virtual arena. The plurality of sound indicators 612 may represent varying levels of sound based on a specific location within the virtual arena. For example, the sound indicators 612 may indicate that lower sections immediately surrounding the basketball court are relatively loud. The sound indicators 612 may indicate that upper sections furthest away from the basketball court are relatively quiet. The sound indicators 612 may indicate that middle sections between the lower sections and the higher sections are medium in terms of noise level. When certain events occur in the 3D virtual environment 620, the sound indicators 612 may dynamically change. For example, when an opposing team scores a basket, the sound indicators 612 may indicate that the lower sections, middle sections, and upper sections are all relatively quiet.

In one configuration, a noise distribution for the 3D virtual environment 620 may be predefined based on a set of rules associated with the online game. For example, the noise level for the upper sections may generally be lower than the noise level for the lower sections to simulate distance. As another example, the noise level for the lower sections may be relatively high when the predefined event involves a home team scoring a basket, whereas the noise level for the lower sections may be relatively low when the predefined event involves an away team scoring a basket.

In an alternative configuration, the noise distribution for the 3D virtual environment 620 may dynamically vary based on audio being received from a plurality of users who are viewing the 3D virtual environment 620. Each user may be assigned a virtual section (e.g., a lower section) within the virtual arena. When an event occurs within the 3D virtual environment 620 (e.g., a team winning the basketball game), some users may cheer while other users are quiet. If the users that are cheering are generally assigned to the lower section of the virtual arena, then the sound indicators 612 may indicate that the noise level for the lower section is relatively high. In addition, the sound indicators 612 may indicate that other sections of the virtual arena (i.e., the sections associated with the users who are quiet) are relatively quiet. As the users watching the 3D virtual environment 620 cheer louder or softer, the sound indicators 612 may indicate that the noise level is increasing or decreasing.

Figure 6B:
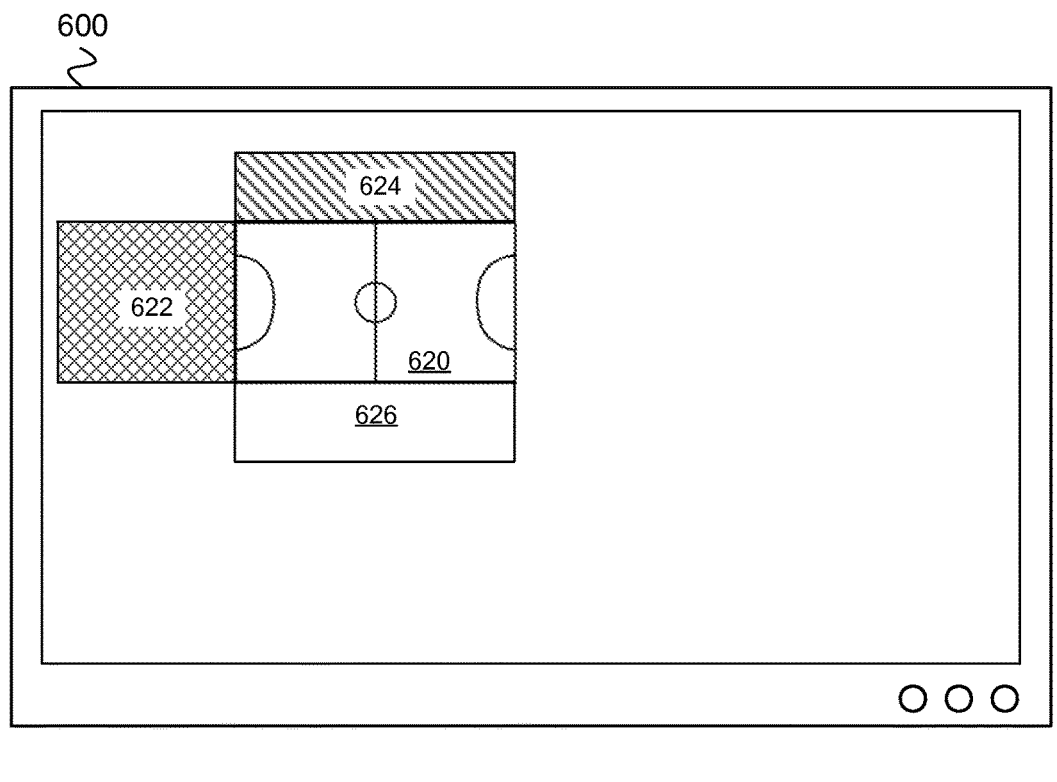
FIG. 6B illustrates graphical objects indicating sound intensity levels for a three dimensional (3D) virtual environment according to an example of the present technology.

FIG. 6B illustrates exemplary graphical objects indicating sound intensity levels for a three dimensional (3D) virtual environment 620. The graphical objects may be displayed as overlays on the 3D virtual environment 620. Each graphical object may indicate a sound intensity level for a particular area within the 3D virtual environment 620. For example, a first graphical object 622 may indicate a relatively high sound intensity level for a first area within the 3D virtual environment 620. A second graphical object 624 may indicate a medium sound intensity level for a second area within the 3D virtual environment 620. A third graphical object 626 may indicate a relatively low sound intensity level for a third area within the 3D virtual environment 620.

Figure 7:
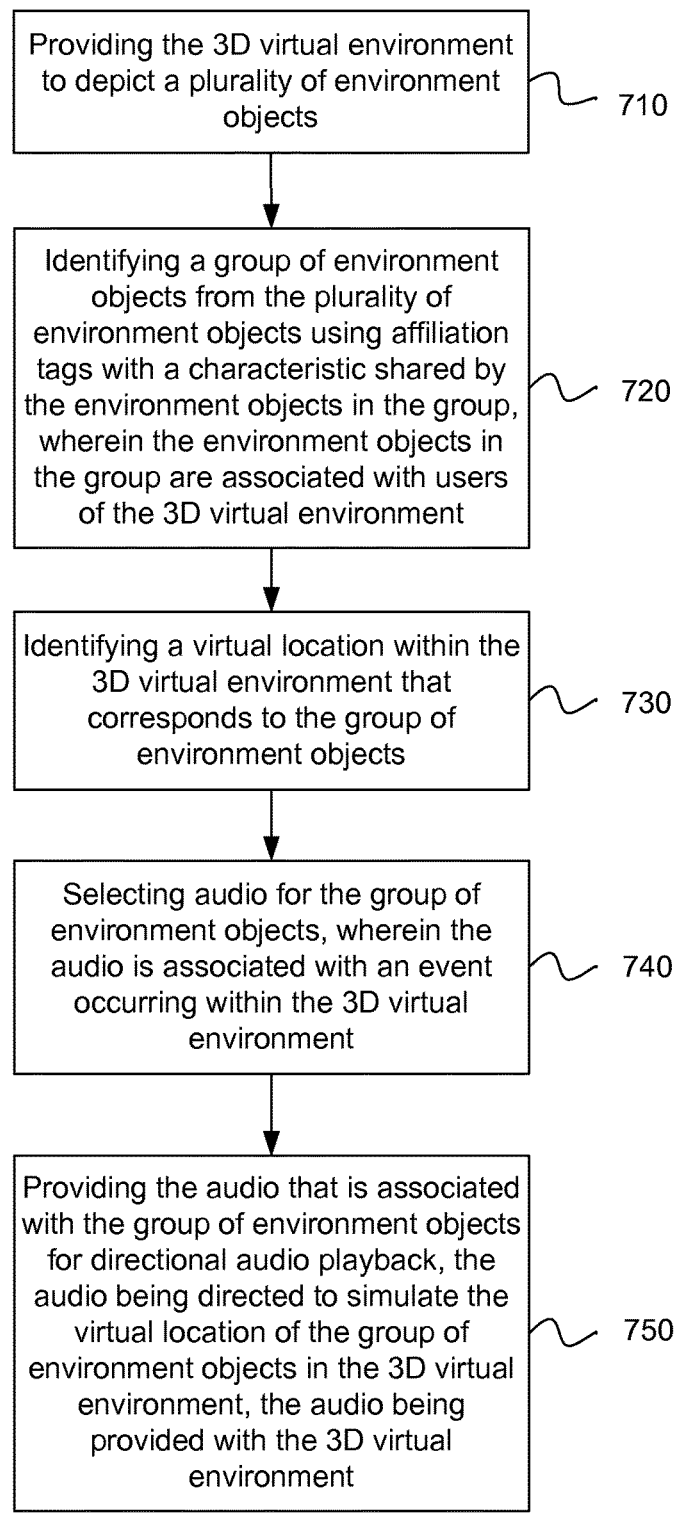
FIG. 7 is a flowchart of an example method for providing directed audio for a three dimensional (3D) virtual environment.

FIG. 7 illustrates an example of a method for providing directed audio for a three dimensional (3D) virtual environment. The 3D virtual environment may be provided to depict a plurality of environment objects, as in block 710. The environment objects depicted in the 3D virtual environment may include at least one of: a person, an animal, a fantasy creature, a fantasy hero, or a machine. In one example, the 3D virtual environment may be associated with a sports game or an action game.

A group of environment objects from the plurality of environment objects may be identified using affiliation tags, as in block 720. The environment objects in the group may share a defined characteristic, as indicated by the affiliation tags. In one example, the defined characteristic that is shared by the environment objects in the group may include a shared affiliation. As a non-limiting example, the affiliation tags may indicate which people in a virtual stadium are cheering for the same team. Therefore, the people who are cheering for the same team may be grouped together.

A virtual location may be identified within the 3D virtual environment that corresponds to the group of environment objects, as in block 730. For example, the virtual location may be associated with a relative orientation, position and/or spatial location within the 3D virtual environment. The virtual location may be relative to a simulated camera position in the 3D virtual environment. As a non-limiting example, the 3D virtual environment may depict a crowd of people in a stadium, of which a subset of the crowd may be identified. The virtual location associated with the subset of the crowd may be a right side of the stadium (i.e., from the perspective of a virtual camera). As another non-limiting example, 70% of the subset of the crowd may be on a left side of the stadium and 30% of the subset of the crowd may be on a right side of the stadium.

Audio for the group of environment objects may be selected, as in block 740. The audio may be associated with a defined event that is occurring within the 3D virtual environment, for example by tagging the audio with information about an event or group of events. The audio may be captured from user devices and tagged using an affiliation tag according to an affiliation of a user and/or the user's environment objects that are also tagged. Then the audio may be processed using the affiliation tags to determine how the audio is to be directionally or otherwise spatially outputted. For example, the audio may be directionally outputted to correspond with the virtual location of the group of environment objects. The defined event may be an action or incident that occurs within the 3D virtual environment. Non-limiting examples of the defined event may include a goal or basket being scored, one party becoming victorious over another party in a battle, one teaming winning over another team in a sporting match, etc. The audio that is selected may correspond to a type of defined event. For example, the audio may be cheering when the defined event involves the goal or basket being scored in the sporting match. In another example, the audio may be a victory song when the defined event involves winning a battle.

The audio that is associated with the group of environment objects with the virtual location in the 3D virtual environment may be provided to enable directional audio playback, as in block 750. The audio may be directed to simulate the virtual location of the group of environment objects in the 3D virtual environment. The audio may be provided with the 3D virtual environment. In one example, the audio may be transmitted for directional playback on a virtualized surround sound system. In another example, the audio may be provided with a sound intensity that corresponds with a number of environment objects in the group and the defined event that occurs within the 3D virtual environment. As a non-limiting example, if a subset of a crowd located at a right side of a virtual stadium (with respect to the virtual camera) cheers when a goal is scored, audio of the cheering may be directed to right-side speakers of a surround sound system. As another non-limiting example, if 70% of the subset of the crowd is on a left side of the virtual stadium and 30% of the subset of the crowd is on a right side of the virtual stadium, then 30% of a sound intensity of the cheering may be directed to the left-side speakers, and 70% of the sound intensity of the cheering may be directed to the right-side speakers.

Figure 8:
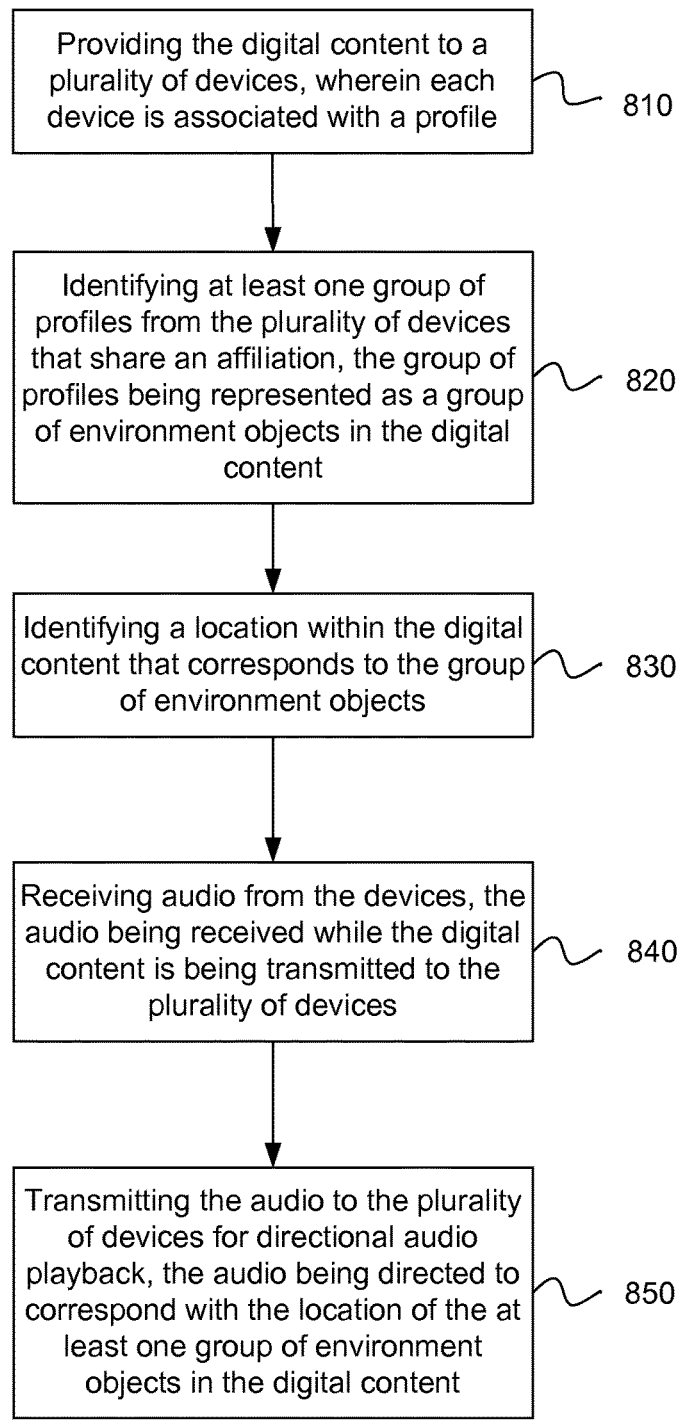
FIG. 8 is a flowchart of an example method of providing audio associated with a virtual environment.

FIG. 8 illustrates an example of a computer implemented method for providing audio associated with digital content. In one example, the digital content may include a virtual environment or a simulated environment. The digital content may be provided to a plurality of devices, as in block 810. For example, the virtual environment may be broadcasted to the plurality of devices to enable users to view the virtual environment. The virtual environment may be generated to depict a plurality of environment objects. The environment objects include at least one of: a person, an animal, a fantasy creature, a fantasy hero, or a machine. In addition, the virtual environment that is transmitted to the plurality of devices may replicate a sports game or an action game that is currently being played by a user or a group of users.

In one example, each device may be associated with a user profile. The user profile may describe a user's interests or affiliations. In other words, the user profile may describe the interests or affiliations of the device's user(s). The interests or affiliations may be related to certain sports players, sports teams, entities in warfare, etc. In one example, the device may be associated with more than one user profile. As a non-limiting example, a first user profile and a second user profile associated with the device may indicate an interest in a particular team.

At least one group of user profiles from the plurality of devices that share an affiliation may be identified, as in block 820. The group of profiles may be represented as a group of environment objects in the digital content. For example, when interests or affiliations listed in a first user profile correlate to interests or affiliations listed in a second user profile, then the first user profile and the second user profile may be grouped together. A group of related user profiles may be represented as a group of environment objects in the virtual environment. As a non-limiting example, a first user profile may indicate an interest in team A. If a second user profile also indicates an interest in team A, then the first user profile and the second user profile may be assembled together in a group.

A virtual location within the digital content may be identified as corresponding to the group of environment objects, as in block 830. The virtual location may be associated with a relative orientation, position and/or spatial location within the virtual environment. The virtual location may be relative to a virtual camera looking into the virtual environment. The virtual location assigned to the group of environment objects may be predefined based on a type of shared affiliation between the user profiles. As a non-limiting example, a group of user profiles each indicating an affiliation with team B may be represented as environment objects at a right side of a virtual stadium (with respect to the virtual camera), whereas a group of user profiles each indicating an affiliation with team C may be represented as environment objects at a left side of a virtual stadium. In other examples, the group of environment objects may be assigned to a front portion of the virtual stadium or a rear portion of the virtual stadium.

Audio may be received from devices that are associated with the group of user profiles, as in block 840. The audio may be received in real time from actual users who are viewing the virtual environment. In other words, the audio may be received from the subset of devices while the virtual environment is being transmitted to the plurality of devices. In one example, the audio that is received may be of a user speaking, yelling, cheering, trash talking, etc. into a microphone of a device. In one example, the audio may be received from the subset of devices when a defined event occurs in the virtual environment. As non-limiting examples, the audio may be received from devices corresponding to a group of related user profiles after a goal is scored or a battle is won.

The audio may be transmitted to the plurality of devices for directional audio playback, as in block 850. The virtual environment may be displayed on the devices during the directional audio playback. The audio may be directed to correspond with the virtual location of the group of environment objects in the virtual environment. The audio may be transmitted to the plurality of devices for directional playback in accordance with a spread value associated with the audio. The audio may be directed with respect to the virtual camera looking into the virtual environment. In one example, the audio may be transmitted to a device for directional audio playback using a virtualized surround sound system. As a non-limiting example, a group of user profiles with an affiliation to team D may be represented as a crowd of people in a rear section of a virtual stadium. Users associated with the user profiles may cheer into a microphone (i.e., thereby generating audio) when team D scores a goal. That audio may be transmitted to device X, which is associated with an environment object that is virtually located in proximity to the virtual field. Therefore, when device X plays the audio of the cheering, a listener may perceive the audio as coming from behind.

In one example, the audio received from the subset of devices while the virtual environment is being transmitted to the plurality of devices may be combined. Mixed audio may be transmitted to the plurality of devices for directional audio playback.

In one configuration, a sound intensity level of the audio received from the subset of devices associated with the group of user profiles may be measured. A graphical object may be generated to represent the sound intensity level of the audio with respect to the virtual location of the group of environment objects in the virtual environment. The graphical object may be integrated with the virtual environment. The virtual environment with the graphical object may be sent to the plurality of devices.

Figure 9:
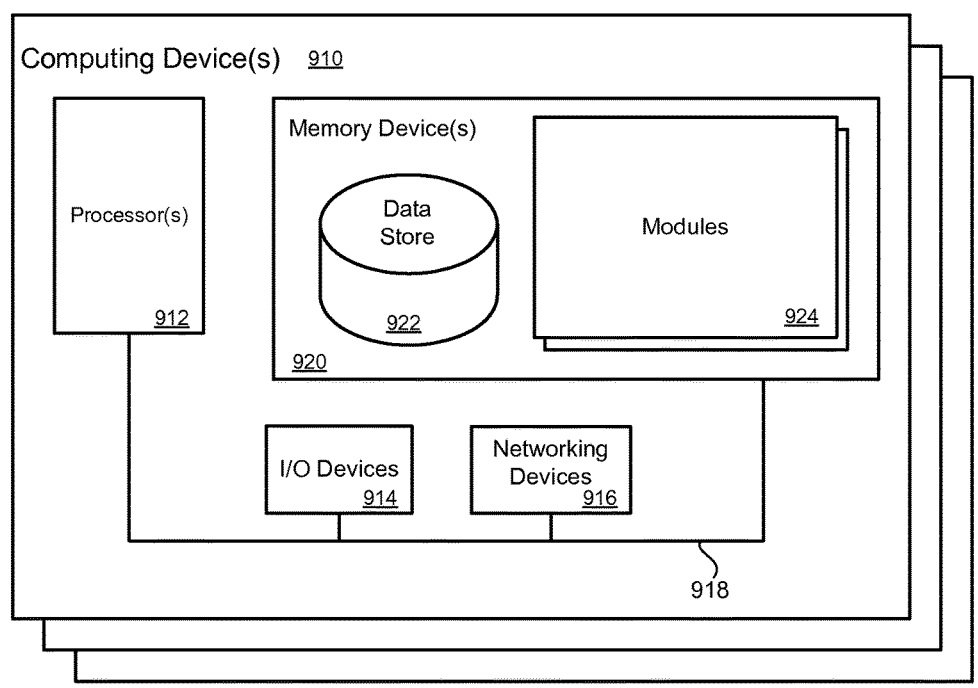
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for providing directed audio for a three dimensional (3D) virtual environment, the method comprising:
   under control of one or more computer systems configured with executable instructions:
   providing, using one or more processors of the computer systems, the 3D virtual environment to depict a plurality of environment objects;
   identifying, using the one or more processors of the computer systems, a group of environment objects from the plurality of environment objects using affiliation tags with a characteristic shared by the environment objects in the group, wherein the environment objects in the group are associated with users of the 3D virtual environment;

identifying, using the one or more processors of the computer systems, a virtual location within the 3D virtual environment that corresponds to the group of environment objects;

selecting, using the one or more processors of the computer systems, audio for the group of environment objects, wherein the audio is associated with an event occurring within the 3D virtual environment; and providing, using the one or more processors of the computer systems, the audio that is associated with the group of environment objects for directional audio playback, the audio being directed to simulate the virtual location of the group of environment objects in the 3D virtual environment, the audio being provided with the 3D virtual environment.

2. The method of claim 1, further comprising transmitting the audio for directional playback on a virtualized surround sound system.

3. The method of claim 1, wherein the environment objects depicted in the 3D virtual environment include at least one of: a person, an animal, a fantasy creature, a fantasy hero, or a machine.

4. The method of claim 1, wherein the characteristic that is shared by the environment objects in the group includes a shared affiliation.

5. The method of claim 1, further comprising providing the audio with a sound intensity that is associated with a number of environment objects in the group and the event that occurs within the 3D virtual environment.

6. The method of claim 1, wherein the users of the 3D virtual environment include players of an online game using the 3D virtual environment or spectators that are watching the online game being played.

7. The method of claim 1, wherein the audio selected for the group of environment objects is captured using a microphone from client devices.

8. A method for providing audio associated with a digital content, the method comprising:
    under control of one or more computer systems configured with executable instructions:
    providing, using one or more processors of the computer systems, the digital content to a plurality of devices, wherein each device is associated with a profile;
    identifying, using the one or more processors of the computer systems, at least one group of profiles from the plurality of devices that share an affiliation, the group of profiles being represented as a group of environment objects in the digital content;
    identifying, using the one or more processors of the computer systems, a location within the digital content that corresponds to the group of environment objects;
    receiving, using the one or more processors of the computer systems, audio from the devices, the audio being received while the digital content is being transmitted to the plurality of devices; and
    transmitting, using the one or more processors of the computer systems, the audio to the plurality of devices for directional audio playback, the audio being directed to correspond with the location of the at least one group of environment objects in the digital content.

9. The method of claim 8, further comprising transmitting the audio for directional audio playback using a surround sound system.

10. The method of claim 8, further comprising:
    combining the audio received from the devices while the digital content is being transmitted to the plurality of devices; and
    transmitting mixed audio to the plurality of devices for directional audio playback.

11. The method of claim 8, further comprising broadcasting the digital content to the plurality of devices to enable users to view the digital content, wherein the digital content is displayed on the devices during the directional audio playback.

12. The method of claim 8, further comprising receiving the audio from a subset of devices when a defined event occurs in the digital content.

13. The method of claim 8, further comprising:
    measuring a sound intensity level of the audio received from the devices associated with the group of profiles;
    generating a graphical object to represent the sound intensity level of the audio with respect to the location of the group of environment objects in the digital content;
    integrating the graphical object with the digital content; and
    sending the digital content with the graphical object to the plurality of devices.

14. The method of claim 8, wherein the digital content that is transmitted to the plurality of devices is a sports game or an action game being played by a user or a group of users.

15. The method of claim 8, wherein the location assigned to the group of environment objects is based on a type of shared affiliation between the profiles.

16. The method of claim 8, wherein the location of the group of environment objects is with respect to a virtual camera looking into the digital content.

17. A system for providing audio for digital content, the system comprising:
    a processor;
    a memory device including a data store to store a plurality of data and instructions that, when executed by the processor, cause the processor to:
    generate the digital content to depict a plurality of environment objects;
    identify a group of environment objects from the plurality of environment objects using affiliation tags with a defined characteristic shared by the environment objects in the group, wherein the environment objects in the group are associated with users of the digital content;
    identify a virtual location within the digital content for the group of environment objects;
    select audio for the group of environment objects that are associated with an event that is occurring within the digital content; and
    transmit the audio that is associated with the group of environment objects at the virtual location to enable directional audio playback, the audio being provided with the digital content.

18. The system of claim 17, wherein the plurality of data and instructions, when executed by the processor, cause the processor to: transmit the audio for directional audio playback on a surround sound system.

19. The system of claim 17, wherein the plurality of data and instructions, when executed by the processor, cause the processor to:
    identify an updated virtual location for the group of environment objects as the environment objects in the group move within the digital content; and transmit the audio that is associated with the updated virtual location to enable directional audio playback.

20. The system of claim 17, wherein the plurality of data and instructions, when executed by the processor, cause the processor to select the audio having a sound intensity that corresponds with a number of environment objects in the group and the event that is occurring within the digital content.

\* \* \* \* \*